United States Patent [19]

Ohta et al.

[11] 4,396,448
[45] Aug. 2, 1983

[54] DECORATIVE LAMINATE AND A MANUFACTURING METHOD THEREFOR

[75] Inventors: Kazuhiko Ohta, Matsudo; Akira Yoshikawa, Tokyo, both of Japan

[73] Assignee: Toppan Printing Co., Tokyo, Japan

[21] Appl. No.: 204,206

[22] Filed: Nov. 5, 1980

[51] Int. Cl.³ .............................................. B32B 31/00
[52] U.S. Cl. .................... 156/219; 101/16; 101/28; 106/38.9; 156/220; 156/222; 156/277; 156/581; 264/220; 264/226; 264/293; 428/156
[58] Field of Search ............... 156/581, 219, 220, 221, 156/222, 277; 264/220, 226, 293; 106/38.27, 38.9; 101/16, 28, 23, 32; 425/385; 29/121.8, 132

[56] References Cited

U.S. PATENT DOCUMENTS

| | | | |
|---|---|---|---|
| 335,628 | 2/1886 | Riddle | 106/38.27 |
| 1,560,838 | 11/1925 | Meloche | 106/38.27 |
| 1,689,073 | 10/1978 | Harvey | 425/385 |
| 1,901,427 | 3/1933 | Alley | 106/38.27 |
| 3,655,312 | 4/1972 | Erb et al. | 101/23 |
| 3,814,647 | 6/1974 | Scher et al. | 156/220 |
| 3,859,110 | 1/1975 | Foster et al. | 264/293 |

FOREIGN PATENT DOCUMENTS

51-7453  3/1976  Japan ................. 106/38.9

*Primary Examiner*—George F. Lesmes
*Assistant Examiner*—E. Rollins Buffalow
*Attorney, Agent, or Firm*—Bacon & Thomas

[57] ABSTRACT

A laminated thermosetting decorative sheet has on its surface glossy protruding parts and matted recessed parts, and the recessed parts are preferably colored. This laminated thermosetting decorative sheet is manufactured using a press plate with an enamel layer having protruding parts whose enamel surfaces are matted.

3 Claims, 12 Drawing Figures

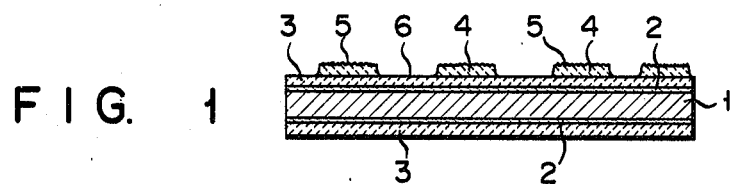
F I G. 1
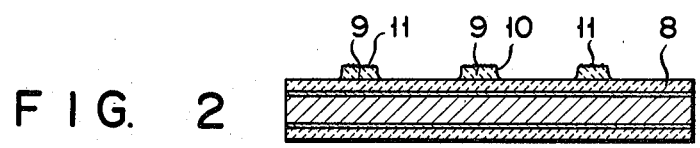
F I G. 2
F I G. 3
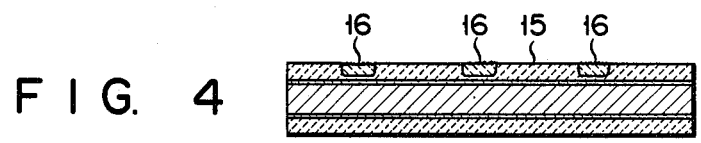
F I G. 4
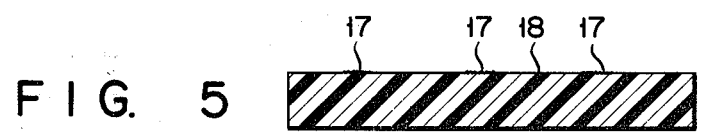
F I G. 5

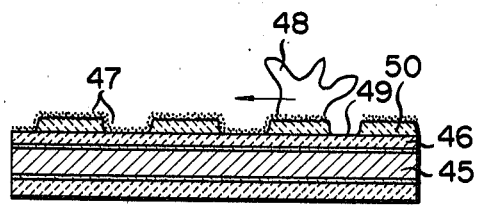
F I G. 9
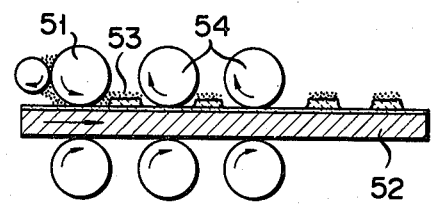
F I G. 10
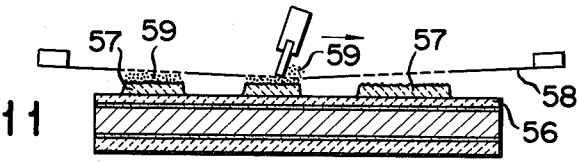
F I G. 11
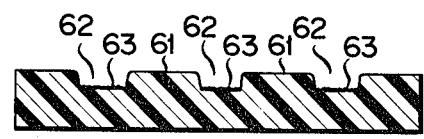
F I G. 12

DECORATIVE LAMINATE AND A MANUFACTURING METHOD THEREFOR

BACKGROUND OF THE INVENTION

The present invention relates to a decorative laminate using thermosetting resin and a manufacturing method therefor.

Decorative laminates can provide various surface shapes, colors, glosses and volumes resembling wood, enamel, pottery, tile, cloisonne ware, natural stone and so on, and they are widely used as raw materials for furniture and building materials. These kinds of decorative laminates are manufactured by impregnating a printed decorative sheet having a printed wood grain or a printed enamel pattern with a thremosetting resin; laminating the printed decorative sheet with core papers, an overlay paper or the like; and hot-pressing the laminated body using a predetermined embossing press plate.

For forming a three-dimensional pattern or a roughened surface for reducing gloss, methods have been proposed such as embossing using an etched or sand blasted metal press plate. However, the procedure for manufacturing such a metal press plate is complex, and the derived metal press plate is extremely expensive. Thus, it has been general practice to manufacture resin press plates using a metal press plate as an original, and to use these resin press plates for actual embossing. However, a resin press plate of, for example, phenol resin or epoxy resin is defective in that a release sheet must be used to prevent adhesion between the plate and the decorative laminate. Its durability has not been satisfactory, either. Further, for various decorative laminates of thermosetting resin, a printed decorative sheet is used which has a printed pattern of an abstract pattern, wood texture, stone grain, a pattern of brick or ceramic, or various other patterns. Even when this printing is very fine, the design of the decorative laminate may not be satisfactory if the resin layer at the surface of the decorative laminate does not have a three-dimensional pattern or a gloss which goes well with the printing. Especially in the case of wood grain patterned decorative laminate, it has been difficult to completely align the part of the printed decorative sheet representing the xylem vessels (hereinafter called the tracheal part) with the recess formed by embossing. For manufacturing this kind of decorative laminate, a so-called wiping method is known according to which a decorative laminate is molded using a press plate with a three-dimensional pattern formed by etching the surface of a metal plate such as stainless steel, then the recess of the derived decorative laminate is painted with ink for coloring the tracheal part. However, with this method, it is extremely difficult in practice to select an ink which strongly adheres to the surface of the decorative laminates and which still presents the other required properties. For example, even when a transparent resin is coated over the ink layer for protecting the ink layer, it is very difficult to obtain the original surface conditions and properties of the decorative laminate of thermosetting resin. Further, in a metal press plate manufactured by etching or sand blasting, the inclination of the protruding and recessed parts is sharp, the protruding part is generally smooth, and the recessed part is rough. Thus, decorative laminates manufactured using such a metal press plate have been defective in their reproduction of the surface of the enamel and the natural materials.

SUMMARY OF THE INVENTION

The primary object of the present invention is, therefore, to provide a laminated thermosetting decorative sheet with improved design.

Another object of the present invention is to provide a method for manufacturing a laminated thermosetting decorative sheet using a press plate which is improved in releasing ability and durability and which is inexpensive.

The present invention provides a decorative laminate which is characterized by having a shape and gloss closely resembling those of an enamel surface, and by having a three-dimensional pattern, a gloss pattern, or both. The gloss pattern consists of glossy parts and matted parts.

As a preferred embodiment of the present invention, a decorative laminate is provided in which the protruding parts formed on the surface have luster, and the bottoms of the recessed parts are matted or roughened.

As another preferred embodiment of the present invention, a decorative laminate is provided in which the bottoms of the recessed parts are roughened and colored. This decorative laminate is suitable as a decorative laminate with wood grain using the above-mentioned recessed parts as the tracheal part.

BRIEF DESCRIPTION OF THE DRAWINGS

FIG. 1 is a sectional view of an embossing press plate having an enamel layer with roughened protruding parts and glossy recessed parts;

FIG. 2 is a sectional view illustrating an embodiment of an embossing press plate having an enamel layer;

FIG. 3 is a sectional view of a decorative laminate manufactured with the embossing press plate shown in FIG. 2;

FIG. 4 is a sectional view of another embodiment of an embossing press plate having an enamel layer;

FIG. 5 is a sectional view of a decorative laminate manufactured with the embossing press plate shown in FIG. 4;

FIGS. 9, 10 and 11 are schematic views illustrating a method for adhering a colorant to the roughened protruding parts alone of an enamel layer of an embossing press plate; and FIG. 12 is a sectional view of a decorative laminate in which the recessed parts are roughened and colored.

DETAILED DESCRIPTION OF THE PREFERRED EMBODIMENTS

Figure 6:
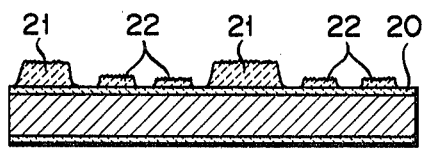
FIG. 6 is a sectional view of an embossing press plate having protruding parts of different heights.

A decorative laminate of the present invention is manufactured by hot-pressing a decorative laminate element using an embossing press plate having an enamel layer on a substrate of metal such as steel, cast iron, aluminum, stainless steel or the like. The enamel layer has a ground coat layer and a cover coat enamel layer on which are formed protruding parts and recessed parts. These protruding parts of the enamel layer are roughened. A press plate suitable for the manufacture of decorative laminates of various patterns may be obtained by changing the height of all the protruding parts, forming the protruding parts with different heights, changing the degree of roughening of the roughened protruding parts of the enamel layer, and so on.

The press plate having the enamel layer on the surface has been proved to be advantageous in the following respects in manufacturing a decorative laminate of thermosetting resin;

(1) A sufficient releasing ability is obtained with thermosetting resins such as melamine formaldehyde resins since the surface of the enamel layer is very hard and fine.

(2) Formation of protruding parts on the surface of the enamel layer may be relatively easily accomplished, for example, by means of screen printing with frit ink.

(3) Roughening the protruding parts may be easily accomplished by methods such as mixing a matting agent into the frit ink.

(4) The bottom surface of recessed parts of the enamel layer is very smooth so that a colorant such as ink adheres only slightly and may be removed easily. Thus, adhesion of the colorant only to the roughened surface of the protruding parts may be easily accomplished.

(5) A decorative laminate with a colored pattern completely corresponding to the three-dimensional pattern of the plate may be obtained since the colorant adhering to the roughened surface is completely transferred to the recessed parts of the decorative laminate when an enamel coated press plate with roughened and colored protruding parts is used.

(6) The colorant transferred to the decorative laminate is tightly bonded to it due to the melting of the thermosetting resin of the decorative laminate.

Although the press plate is described with reference to a plate shape, it may take a roll shape.

The process of forming recessed parts and protruding parts on the enamel layer of the press plate will be described. First, a ground coat layer and a cover coat enamel layer are formed by a known method on a metal substrate which has been pretreated, for example, by degreasing. The ground coat layer and the cover coat enamel layer may be prepared by adding a mill addition agent and water to a glass powder called frit; grinding and kneading the mixture in a ball mill to obtain a slip; coating the slip using, for example, a spray gun; and firing the coated substrate at, for example, 500°–900° C. The frit to be used may be of the general kind and may have as its main components $SiO_2$, $Al_2O_3$, $B_2O_3$, $Na_2O$, $K_2O$, $CaO$, $ZnO$, $MgO$ and the like. The mill addition agent may be a suspension material such as clay, an emulsifying material such as tin oxide, a colorant, borax, or an electrolytic material such as magnesium sulfate.

Enamel protruding parts are formed on the cover coat enamel layer. The protruding parts may be roughened, for example, by adding a matting agent. The method for matting will be described hereinbelow. For forming the protruding parts, it is possible to print a protruding pattern on the surface of an enamel layer by screen printing using an ink having a glass content of cover 10%, e.g., frit ink, and then firing. It is also possible to apply an adhesive in a desired pattern on the surface of the enamel layer, to scatter glass powder called frit thereover, and to fire after removing the frit on parts other than the pattern. It is further possible to form a protruding pattern on the surface of the enamel layer by using a transfer sheet with a pattern formed on a sheet such as a paper sheet or a plastic film by ink containing a pigment and frit, and firing.

The method for forming a protruding part and a recessed part on the enamel layer of a press plate will now be described in more detail.

In the embodiment shown in FIG. 1, ground coat layers 2 are formed on both surfaces of a metal substrate 1, although these ground coat layers are not essential. Formation of these layers is preferable since it improves both the adhesion between a cover coat enamel layer and the metal substrate, and the durability of the press plate. It is further preferable to form a ground coat layer on the back surface of the metal substrate to prevent warping and corrosion of the press plate. A so-called black ground coat layer containing cobalt oxide may be used for the ground coat layers. After completing firing of the ground coat layers 2 and cooling the substrate, a cover coat enamel layer 3 is formed over each ground coat layer 2. For the cover coat enamel, a slip may be used, that is, glaze which is prepared by adding a mill addition agent to a commercially available enamel frit and by grinding the mixture in a ball mill. The coating method may be arbitrarily selected. However, coating may be generally accomplished by spraying when the press plate has large dimensions. As in the case of the ground coat layers, a cover coat enamel layer is preferably formed on both surfaces of the substrate.

The finished conditions of the surface of the cover coat enamel layer may be varied by suitably selecting the kinds of frit and mill addition agent to be used, the viscosity of the slip when coated, the coating method, the firing temperature and the like. That is, a desired finished condition may be formed on the surface varying from an even condition to a slightly and smoothly waving condition. For forming a three-dimensional pattern, methods mentioned above may be adopted. Easy methods are to increase the viscosity of the slip, to degrade the leveling, or to enlarge the diameter of the drops of slip by decreasing the air pressure of the spray gun. In this case, fluctuations in the height of the pattern in the cover coat enamel layer need to be kept in a certain range since too much fluctuation tends to cause irregular transfer of ink on the layer in screen printing or in the transfer procedure. As for the luster of the surface of the cover coat enamel layer, an arbitrarily selected degree of luster may be obtained varying from a condition corresponding to a completely mirror surface to a completely matted surface. Matting of the surface of the cover coat enamel layer may be easily accomplished by adding a matting agent to the glaze or by lowering the firing temperature. Further, the surface conditions of the cover coat enamel layer may also be changed by suitably selecting glazes of different particle size or different melting points. In either case, the cover coat enamel layer should not be too thick, preferably below 500μ. If it is too thick, it might lead to breakage due to the pressure in hot-pressing.

Methods for forming protruding parts 4 on the surface of the fired cover coat enamel layer 3 by screen printing or by transfer as in FIG. 1 will be described in more detail.

The method utilizing screen printing will first be described. The printing screen may be one using a screen of 150-200 mesh or, more preferably for the present method, one using a thick screen of 60-70 mesh. In the latter case, since the thickness of the ink layer is great, the decorative laminate manufactured will have excellent three-dimensional effects. The mesh, wire diameter, thickness of the screen, screen material to be used and the like are determined according to the desired effects, the desired fineness of the pattern and so on, but a screen of 30-250 mesh using monofilament threads or multifilament threads of nylon or polyester is generally used. As for the screen ink, commercially available frit ink is used, that is, commercially available printing glass frit which is finely ground and kneaded in screen oil.

The method utilizing transfer will now be described. A predetermined pattern or frit ink is printed on a surface of a base material such as a paper sheet or a film by a desired printing method such as the screen printing or photogravure printing. Screen printing enables the printing of thick patterns, and photogravure printing enables the printing of fine patterns. The transfer method may be arbitrarily selected from conventional methods such as a method for forming a varnish transfer layer on the surface of the cover coat enamel layer and for transferring by pressing, or a method for forming a varnish transfer layer on the surface of the transfer paper and for transferring it directly to the surface of the cover coat enamel layer. The transfer method is advantageous in that the transfer paper may be printed in advance and the actual transfer may be easily accomplished by the water transferring method or with a simple machine. However, the thickness of the formed ink layer is limited and the height of the raised ink layer is slightly inferior in comparison with the direct printing method of screen printing.

As mentioned previously, it is possible to form the surface of the protruding parts 4 as a matted surface 5 so as to provide different surface conditions from those of recessed parts 6. The matting of the protruding parts may be easily accomplished by using a matting ink obtained by mixing a matting agent into the frit ink to be transferred to the enamel layer or the cover coat enamel layer by screen printing or by transfer. It is alternatively accomplished by mixing into the ink coarse particles of high melting point such as alumina or zirconium oxide. In this case firing must be performed at a temerature at which alumina or zirconium oxide does not melt. In order to emphasize the matted surface of the protroduing part and to improve the design effects, the cover coat enamel layer 3 constituting the recessed parts 6 are preferably smooth. However, the surface of the cover coat enamel layer need not be even and may have smooth undulations and swellings. A decorative laminate molded by the press plate shown in FIG. 1 has a matted surface at the bottom of each recessed part and has a smooth surface at the protruding parts and is thus superior in design. With a conventional etched metal press plate, the recessed part becomes matted, and the protruding parts of the derived decorative laminate are thus matted while the recessed parts are smooth. It is difficult to manufacture a decorative laminate as obtained in accordance with the present invention with this type of press plate.

Several embodiments of a decorative laminate having such matted surfaces will be described. In the first embodiment, as shown in FIG. 2, a raised ink layer is printed on the surface of a cover coat enamel layer 8 with a thick printing screen using a frit ink 9 containing a matting agent. By firing at a suitable temperature, sides 10 of protruding parts 9 are melted and joined with the cover coat enamel layer 8 to form a shiny surface. Top surfaces 11 alone are matted. A decorative laminate manufactured with the press plate shown in FIG. 2 has round shoulders 13 of shiny protruding parts 12 and matted surfaces at the bottom of recessed parts 14 as shown in FIG. 3. A decorative laminate having a tile pattern is easily obtained with this method. Such a decorative laminate may be manufactured with a press plate made by printing a part corresponding to the joint of the tiles using a frit ink containing a matting agent and then firing. This decorative laminate is very similar to real tiles as the parts corresponding to the shoulders of the tiles are rounded and the joint parts are matted.

The second embodiment is shown in FIGS. 4 and 5. As shown in FIG. 4, it is possible to form an ink layer 16 which is of the same level as a cover coat enamel layer 15 and which is matted on the surface by adjusting the specific gravity of the frit ink containing a matting agent or by adjusting the firing temperature. A decorative laminate manufactured with this press plate is shown in FIG. 5. Its surface is substantially even but has partially matted parts 17 and shiny parts 18. Thus it is suitable as a decorative laminate having a pattern of natural stone or the like.

Various finished surfaces may also be obtained by suitably combining the screen printing and transfer methods for forming the protruding parts on the cover coat enamel layer. Either of these two methods may be repeated for better effects. For example, more than one printing screen, each having a different thickness, may be used for varying the height of the protruding parts in several steps. The luster may also be varied by changing the ink composition. In manufacturing a press plate of this type, the transfer of the ink layer and the firing may be repeated, or firing may be performed after several transfers of the ink layer. A press plate with protruding parts formed using two plates of different film thickness has a high protruding part 21 and a low protruding part 22 on the cover coat enamel layer 20, as shown in FIG. 6. A decorative laminate manufactured using such a press plate has matted recessed parts of different depth and can thus provided a good design.

Figure 7:
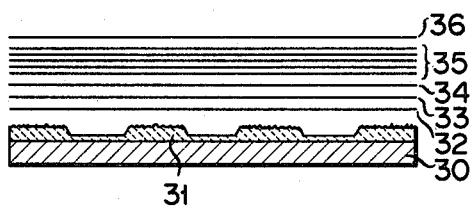
FIGS. 7 and 8 are schematic sectional views illustrating a method for hot-pressing decorative laminate elements with an embossing press plate having an enamel layer.

A process for manufacturing a decorative laminate of thermosetting resin using an embossing press plate having an enamel layer of this type will now be described. The thermosetting resin to be used here may be a melamine resin such as a melamine formaldehyde resin, diallyl phthalate resin, a polyester resin, a guanamine resin or the like. The manufacturing method will be described with reference to FIG. 7, taking a decorative laminate of melamine formaldehyde as an example.

Over an enamel layer 31 of a press plate 30 with a three-dimensional pattern are placed in the order named: a decorative laminate element, that is, a melamine formaldehyde resin impregnated overlay paper 32; a printed decorative sheet 33 similarly impregnated with a melamine formaldehyde resin; a barrier paper 34 similarly impregnated with a melamine formaldehyde resin, if needed; a required number of core materials 35 impregnated with a phenol resin; and a warping-preventive sheet 36. Several such combinations are stacked and are put with cushions in a hot-press for hot-pressing. Since the enamel layer 31 of the press plate 30 has releasing ability with respect to thermosetting resins, there is no need to interpose a special release sheet or a releasing film. Further, if an enamel layer is also formed on the rear surface of the press plate 30, this surface will not adhere to the decorative laminate element.

The pressing conditions may be the same as in the case of a conventional method for manufacturing a decorative laminate of melamine formaldehyde resin and need not require special consideration. The preferred temperature is, at maximum, 140°–160° C., the pressure is 50–120 kg/cm², the heating time is 15–30 minutes, and the cooling time is 15–30 minutes.

Figure 8:
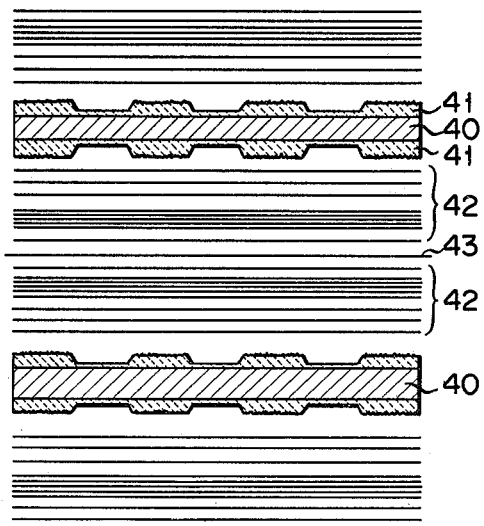

Three-dimensional patterns may be formed on both enamel layers 41 of a press plates 40 as shown in FIG. 8, and two sets of decorative laminate elements 42 may then be interposed between each pair of press plates 40 for pressing. Since embossing can be accomplished with both surfaces of the press plate, the required number of press plates may be cut in half. However, a release sheet 43 must be interposed between each pair of decorative laminate elements 42 which are in turn interposed between the press plates 40.

EXAMPLE 1

A cold-rolled steel plate of 1.6 mm thickness for forming an enamel layer was cut into predetermined dimensions, and degreasing, pickling and water rinsing were performed thereafter.

A black ground coat having the composition shown below was uniformly sprayed on both surfaces of the steel plate. After drying, the plate was fired, under the condition that the maximum temperature of 870° C. was maintained for 3 minutes.

Black ground coat composition:

| Ground coat frit | 100 parts by weight |
| --- | --- |
| GAIROME clay | 7 parts by weight |
| Feldspar | 3 parts by weight |
| Borax | 0.75 part by weight |
| Magnesium sulfate | 0.25 part by weight |
| Water | 40 parts by weight |

A white cover coat enamel of the composition shown below was uniformly sprayed over both surfaces of the steel plate to which had already been applied the ground coat. After drying, firing was performed under the condition that the maximum temperature of 850° C. was maintained for 2 minutes.

White cover coat enamel composition:

| Cover coat enamel frit | 100 parts by weight |
| --- | --- |
| GAIROME clay | 5 parts by weight |
| Tin oxide | 8 parts by weight |
| Magnesium sulfate | 1 part by weight |
| Water | 50 parts by weight |

The surface of the derived cover coat enamel layer had excellent luster and smoothness. Parts corresponding to the joints of hexagonal tiles were printed on this cover coat enamel layer surface using a printing screen of 70 mesh. The ink was prepared by kneading screen oil with a commercially available printing frit (already ground) with matting agent added. The firing was performed under the condition that a maximum temperature of 750° C. was maintained for 2 minutes. The edges of the ink layer were shiny and rounded by melting, and the tops of the ink parts were matted. The ink layer also formed protruding parts integral with the cover coat enamel layer.

A decorative laminate of melamine formaldehyde resin was pressed using the plate press plate. As a printed decorative sheet, a titan paper sheet with a printed pattern of tiles was prepared in advance. Hot-pressing was performed by the conventional method. The pressing conditions of the hot-cold method were: 145° C. maximum temperature, 20 minutes heating, 80 kg/cm² pressure, and 20 minutes cooling. A release sheet was not used. The decorative laminate thus obtained had a well matched, smooth, enamel-like surface with a printed pattern on the protruding parts and matted parts corresponding to the joints of tiles; these parts closely resembled the real joints of tiles. This decorative laminate of melamine formaldehyde resin as a whole presented an outer appearance which closely resembled the real surface of tiles. The press plate endured over a hundred repeated pressings.

EXAMPLE 2

Screen printings of the combination shown below were performed on the surface of a cover coat enamel layer obtained by a method similar to that of Example 1.

| No. | Screen mesh | Pattern | Ink |
| --- | --- | --- | --- |
| 1 | 150 mesh | Stone grain texture | Shiny |
| 2 | 60 mesh | Modified tile joint | Matting |

After completing the No. 1 printing, the ink layer was dried by heating to 100° C. After drying, the No. 2 printing was performed. Firing was then performed to integrate the ink layer with the cover coat enamel layer. The firing conditions were the same as in Example 1. The surface of the press plate thus obtained was shiny and protruded slightly at parts corresponding to stone grain texture; it was highly raised and matted at parts corresponding to tile joints; and it was rounded and shiny at the shoulders of the protruding ink layer. A decorative laminate of melamine formaldehyde resin was molded with this enamel plate as a press plate under the same conditions as in Example 1. The obtained decorative laminate had, at parts, an appearance similar to the joints of tiles and had fine stone grain texture on parts corresponding to the surface of the tiles. Thus, the outer appearance resembled that of real tiles more than in the case of Example 1.

EXAMPLE 3

A diallyl phthalate impregnated paper sheet was placed over a plywood board of 4 mm thickness. Hot-pressing was performed using the press plate obtained in Example 1 at a temperature of 130° C. and a pressure of 10 kg/cm² for 15 minutes. The press plate released without the use of a release sheet. The decorative laminate of diallyl phthalate had an appearance similar to that of the decorative laminate obtained in Example 1.

EXAMPLE 4

In manufacturing the press plate of Example 2, the stone grain texture was printed on a transfer paper sheet in advance. This printed pattern was transferred to the surface of the cover coat enamel layer. One printing process was thus eliminated by this transfer. The press plate obtained had the same finish as in the case of Example 2.

EXAMPLE 5

Black ground coat (SG-Q manufactured by Nihon Frit Co., Ltd.) was uniformly applied to both surfaces of a pretreated steel plate of 1.6 mm thickness for forming an enamel layer. Firing was performed under the condition that a maximum temperature of 870° C. was maintained for 3 minutes. Semi-matting white cover coat enamel (manufactured by Nihon Frit Co., Ltd.) was also applied to both surfaces of the plate. Firing was again performed under the condition that a maximum temperature of 750° C. was maintained for 2 minutes. Printing of parts corresponding to the tracheal parts of wood grain was performed with a matting ink using a printing screen of 200 mesh on the surface of the cover coat enamel. Firing was performed again under the condition that the maximum temperature of 730° C. was maintained for 2 minutes. The enamel plate thus obtained was semimatted at the surface of the cover coat enamel, and completely matted at parts corresponding to the tracheal parts of the wood grain. The shoulders of the ink layer were not rounded, but remained sharp. The enamel plate thus obtained was used as a press plate. Hot-pressing was performed by the conventional method using a printed decorative sheet with the printed pattern of a Japanese oak and imprengated with melamine formaldehyde resin (Nika Resin manufactured by Nihon Carbide Industries Co., Inc.). The decorative laminate of melamine formaldehyde resin thus obtained had recessed tracheal parts. These tracheal parts were matted, providing a decorative laminate superior in design.

In accordance with the present invention, it is possible to manufacture a decorative laminate in which a colorant is fixed to the recessed parts by using a press plate which holds the colorant in the matted parts of the protruding parts formed on the enamel layer of the press plate.

The colorant to be used may be selected freely if it is compatible with the molten thermosetting resin in the molding process, and it may be a single pigment. Various studies have been made in consideration of the durability of the decorative laminate obtained. As a result of such studies, it has been proved that the colored parts of the obtained decorative laminate are stable if a colorant is used which contains, in addition to the coloring components such as pigments, a resin is a binder, this resin being the same thermosetting resin used for the decorative laminate, or a thermosetting resin which is compatible with such a thermosetting resin of the decorative laminate and which has a lower curing temperature than that of the thermosetting resin of the decorative laminate. The results of a test of the adhesion of the various colorants fixed by the above-mentioned method to the decorative laminate of melamine formaldehyde resin are shown in Table 1. The evaluations concern the degree of fading after wiping the colored part of the decorative laminate 100 times with a cloth wet with lacquer thinner.

TABLE 1

| Colorant | Binder | Nature | Durability of the decorative laminate |
| --- | --- | --- | --- |
| Ink A for decorative laminate | Cellulose based resin | Liquid (soluble in oil) | Poor |
| Ink B for decorative laminate | Cellulose or acryl based resin | Liquid (soluble in water) | Fair |
| Screen ink A | Alkyd resin | Liquid (soluble in oil) | Fair |
| Screen ink B | Alkyd resin, melamine resin | Liquid (soluble in oil) | Good |
| Sample ink A | Melamine resin | Liquid (soluble in water) | Good |

TABLE 1-continued

| Colorant | Binder | Nature | Durability of the decorative laminate |
| --- | --- | --- | --- |
| Sample ink B | Epoxy resin | Liquid (soluble in oil) | Good |
| Pigment A | None | Powder | Poor |
| Pigment B | Vinyl resin | Powder | Poor |
| Powder paint A | Polyamide resin | Powder | Poor |
| Powder Paint B | Polyester resin | Powder | Fair |
| Sample toner | Melamine resin | Powder | Good |

As may be seen from the above table, it was found that, in the case of a decorative laminate of melamine formaldehyde resin, the resistance of the colored parts to thinner is improved by using a colorant containing, as a binder, a thermosetting resin such as a melamine formaldehyde resin or an epoxy resin. In the case of the powder paint B in Table 1, although the binder was thermosetting, sufficient curing was not obtained since the curing temperature was higher than the pressing temperature of the decorative laminate of melamine formaldehyde resin. This relation between the resin of the decorative laminate and the binder is applicable to decorative laminates of other thermosetting resins such as diallyl phthalate and polyester resin. The colorant containing the coloring components and a binder may be in liquid form or in powdered form. However, the powdered form is preferable since it may be easily removed from the smooth parts of the press plate.

A method for holding the colorant in only the matted parts of the enamel layer of the press plate will be described. The so-called wiping method is easiest and preferable. As shown in FIG. 9, a colorant 47 is applied to the entire surface of an enamel layer 46 of a press plate 45, and the surface is wiped with a cloth or a paper sheet 48. The colorant on a smooth part 49 is thus removed. Wiping is easy if the cloth or paper sheet is wet with a solvent of the colorant used. Although the colorant on the smooth part 49 of the enamel layer is easy to wipe away, it is hard to wipe off a matted part 50 since the colorant eats into the fine recesses on the surface. In real manufacture, wiping of the pressing plate is hard to accomplish manually since the press plate is quite large. Thus, it is preferable to use a wiping machine as shown in FIG. 10. As shown in FIG. 10, a colorant 53 is applied to the entire surface of a press plate 52 by a coating roll 51. It is wiped away by a wiping roll 54 rotating in opposition to the movement of the press plate 52. When the colorant is a liquid, a wiping roll of rubber is used. When the colorant is a powder, a soft material such as a cotton roll is sed for the wiping roll. With this method, wiping can be accomplished over the entire surface of a press plate of large area in a uniform manner, and the colorant is left only on the matted part. The technique of screen printing may alternatively be used. As shown in FIG. 11, a printing screen 58 used for forming matted parts 57 on the surface of an enamel layer 56 is fixed on the enamel layer 56 so that the line drawing parts of the printing screen 58 and the matted parts 57 of the enamel layer are aligned. A colorant 59 is printed by screen printing so that the matted parts 57 alone are colored. The particular printing screen used for forming the matted part is not required; a separate printing screen made from the same positive pattern may alternatively be used. Especially when the printing screen used for forming the matted parts is of low mesh and great thickness, the same printing screen is not preferable since to much colorant is then applied. Thus, better results are obtained when a separate printing screen is prepared which is less thick and around 200 mesh. Further, when the positive used for forming the matted parts is not used, but a corrected positive with slightly narrower line drawing parts is used for manufacturing a printing screen, workability is improved since then the colorant does not leak out from the matted parts of the enamel layer.

Further, it is possible to apply more than one color by dividing the matted parts between more than one printing screen and coloring the matted parts with colorants of different hues. The decorative laminate thus obtained is colored in more than one color and is ornamentally improved.

In any of the above methods for applying a colorant or colorants to the matted parts by the wiping method or the screen printing method, the water or volatile material such as a solvent in the colorant attached to the matted parts of the enamel layer is removed by thorough drying when a liquid colorant is used. When too much of such materials remain, they are evaporated in the pressing process of the decorative laminate and might lead to surface irregularities or blisters of the decorative laminate. Such consideration need not be made when a powdered colorant is used.

It is thus possible in this manner to mat and color the recessed parts of a decorative laminate of thermosetting resin by using a press plate holding a colorant or colorants only on its matted parts. The pressing method of the decorative laminate is not different from that described with reference to FIGS. 7 and 8. The thermosetting resin, melted once in the process of hot-pressing the decorative laminate, forms recessed matted parts when pressed by the protruding matted parts of the enamel layer of the press plate, and at the same time is combined with the colorant applied to the protruding matted parts of the enamel layer of the press plate. By curing the thermosetting resin, the colorant is securely attached to the recessed matted parts of the decorative laminate and does not remain on the enamel layer of the press plate. Thus, the press plate may immediately be returned to the process of applying a colorant for a next pressing procedure. The decorative laminate thus obtained is shown in FIG. 12. This decorative laminate has smooth protruding parts 61, and the bottoms of recessed parts 62 are matted and colored a desired color by a colorant 63. Thus, the obtained decorative laminate is vastly superior in design. In particular, when a printed decorative sheet with a tile or stone pattern is used together with matted parts of an enamel layer of matched sand grain or tile joint pattern (embossed pattern), the obtained decorative laminate closely resembles the real tile or ceramic finish and is superior in design. More preferably, when a printed decorative sheet of wood grain pattern is used together with a press plate having matted parts of the enamel layer of a tracheal pattern, a decorative laminate is obtained whose recessed parts are colored the color of the tracheal part. In the decorative laminate of wood grain thus obtained, the tracheal recessed parts and the colored parts are completely aligned, unlike in the case of the conventional method according to which the color of the tracheal parts is printed on the printed decorative sheet. Thus, this decorative laminate of wood grain is far superior in design and is capable of reproducing the pattern of natural wood grain faithfully.

EXAMPLE 6

An extremely low carbon steel plate of 1.6 mm thickness for forming an enamel layer was cut to a predetermined size and thereafter degreased, pickled, and rinsed with water. Black ground coat was sprayed on both surfaces of the steel plate. After drying, firing was performed under the condition that the maximum temperature of 870° C. was maintained for 3 minutes. White cover coat enamel was similarly applied thereover on both surfaces. After drying, firing was again performed under the condition that the maximum temperature of 850° C. was maintained for 2 minutes. The surface of the cover coat enamel layer thus obtained was shiny and smooth. Parts corresponding to the joints of hexagonal tiles were printed on the surface of the cover coat enamel layer using a printing screen of 70 mesh. The ink was prepared by pulverizing screen oil with a commercially available printing frit with a matting agent added (already ground). Firing was performed under the condition that the maximum temperature of 750° C. was maintained for 2 minutes. The edges of the ink layer were rounded and became glossy. The tops of the ink layer were matted. The ink layer protruded from the cover coat enamel layer and were formed integrally therewith.

A colorant of the composition shown in Table 2 below was applied to the surface of a press plate manufactured by the above method. The colorant was wiped away with a cloth wet with water, and the colorant remained only on the matted parts.

TABLE 2

| | |
|---|---|
| Melamine resin | 100 parts by weight |
| (Nika Resin S-260 manufactured by Nihon Carbide Industries Co., Inc.) | |
| Carbon black | 4 parts by weight |
| Iron oxide based yellow pigment | 16 parts by weight |
| Iron oxide based red pigment | 5 parts by weight |
| Water | 100 parts by weight |
| Surface active agent | 2 parts by weight |
| Thickener | 2 parts by weight |

A melamine decorative laminate was pressed using a press plate having an enamel layer with a colorant attached only to the matted parts after drying the water content in the colorant. A titan paper with a printed tile pattern was used as the printed decorative sheet, and hot-pressing was performed by the conventional method. The hot-cold molding method was adopted at a maximum temperature of 145° C., a heating time of 20 minutes, a pressure of 80 kg/cm$^2$, and a cooling time of 20 minutes. No release sheet was used. The decorative laminate obtained had protruding parts of smooth surface with luster similar to that of the enamel and a matched printed tile pattern, and recessed parts with a matted surface and a resistered colored pattern. The decorative laminate obtained as a whole was superior in design. Its outer appearance was extremely similar to that of a real tile pattern. In the colored recessed parts, the colorant become integral with the melamine formaldehyde resin and adhered strongly, so that no disorders were noted after the decorative laminate was wiped a hundred times with a coth wet with a thinner. Further, the colorant was completely transferred to the decorative laminate in the molding procedure, and no colorant remained on the surface of the enamel layer after the mold was opened.

EXAMPLE 7

As in Example 6, a printing screen was used as a means for applying a colorant to the enamel layer of a press plate. The screen was made from a nylon screen of 200 mesh using, as a positive pattern, a hexagonal tile pattern which was previously used for forming a matted surface on the press plate. The coloring of the matted surface of the decorative laminate was extremely easy with this method, enabling coloring of higher concentration.

EXAMPLE 8

A melamine decorative laminate was manufactured by a method similar to that of Example 6, except that the colorant of the composition shown in Table 2 was dried and ground in advance to be applied in a powdered form. The application of the colorant was much easier and smoother than in the case of a liquid colorant. The durability of the colored parts of the decorative laminate obtained was equivalent to that of the laminate obtained in Example 6.

EXAMPLE 9

Screen printings of the combinations shown in Table 3 below were performed with frit ink on the surface of the cover coat enamel layer of a press plate obtained by the same method as in Example 6.

TABLE 3

| No. | Screen mesh | Pattern | Frit ink |
|---|---|---|---|
| 1 | 150 mesh | Stone grain texture | Matting |
| 2 | 60 mesh | Modified tile joint | Matting |

After the No. 1 printing, the ink layer was dried by heating to 100° C. Then after the No. 2 printing, firing was performed to adhere both ink layers to the cover coat enamel layer. The firing conditions were the same as in Example 6. In the surface of the enamel layer of the press plate thus obtained, the parts corresponding to the stone grain texture were matted and protruded slightly; the parts corresponding to the joints of the tiles were matted and protruded higher than the stone grain texture parts; and the shoulders of the ink layer were rounded and shiny.

Printing screens of 200 mesh were manufactured with the positive patterns used in the respective No. 1 and No. 2 printings above. Using each of the printing screens, the matted surface of the enamel layer of the press plate was colored according to Table 4 shown below.

TABLE 4

| No. | Screen mesh | Pattern | Colorant |
|---|---|---|---|
| 1' | 200 mesh | Stone grain texture | Light gray |
| 2' | 200 mesh | Modified tile joint | Black |

The composition of the colorant was as shown below:

TABLE 5

| No. 1' Colorant (light gray) | |
|---|---|
| Melamine formaldehyde resin (S-260) | 100 parts by weight |
| Carbon black | 2 parts by weight |
| Titanium dioxide | 23 parts by weight |
| Water | 100 parts by weight |
| Surface active agent | 2 parts by weight |

TABLE 5-continued

| Thickener | 2 parts by weight |
|---|---|
| No. 2' Colorant (black) | |
| Melamine formaldehyde resin (S-260) | 100 parts by weight |
| Carbon black | 25 parts by weight |
| Water | 100 parts by weight |
| Surface active agent | 2 parts by weight |
| Thickener | 2 parts by weight |

After drying the colorants, a melamine decorative laminate was manufactured with this press plate. The decorative laminate of melamine formaldehyde resin obtained was matted and colored black in the tile joint parts; and was smooth with fine matted recesses and colored gray in the tile surface parts. The decorative laminate as a whole was superior in design, and presented an appearance which extremely resembled the surface of real tiles.

EXAMPLE 10

The press plate used in Example 6 and the colorant of the composition shown in Table 6 were used for applying a colorant to the matted surface of the press plate. A paper sheet impregnated with diallyl phthalate resin was placed on a plywood board of 4 mm thickness, and hot-pressing was performed at 130° C. and 10 kg/cm² for 15 minutes.

TABLE 6

| Diallyl phthalate resin prepolymer | 93 parts by weight |
|---|---|
| Diallyl phthalate resin monomer | 7 parts by weight |
| Pigment | 25 parts by weight |
| Solvent (Acetone: MIBK 1:1) | 100 parts by weight |

The plate was released with ease without using a releasing film. The DAP decorative laminate thus obtained had an outer appearance similar to that of the decorative laminate of melamine formaldehyde resin obtained in Example 6, and the adhesion of the colorant to the matted surface of the recessed parts was sufficiently strong.

EXAMPLE 11

After pretreating both surfaces of a steel plate of 1.6 mm thickness, smooth ground coat layers were formed. Smooth cover coat enamel layers were formed over the ground coat layers on both surfaces of the plate. The cover coat enamel layers were adjusted by adding 10 parts by weight of a matting agent to 100 parts by weight of frit so that the surface luster had a mirror reflectivity of about 70. A tracheal pattern of walnut wood was printed on the cover coat enamel layers using a printing screen of 150 mesh. The ink used was a completely matting frit ink. The press plate obtained by firing had a protruding part of about 5μ height as a completely matted tracheal pattern on the smooth semi-glossy cover coat enamel layer. A dark brown ink was applied to the entire surface of this press plate and was wiped away with a felt blanket immediately thereafter so that ink on parts other than the tracheal part was removed. The ink contained, as its main components, an alkyd resin, a melamine resin, a pigment, and a solvent. Using as a pattern paper, a titan sheet which was impregnated with a melamine resin and printed with a walnut pattern in advance, a melamine resin decorative laminate was molded under normal conditions with press plates inked with a coloring ink. The recessed parts of the surface of the decorative laminate obtained were matted and had tracheal hole patterns which were colored dark brown and which closely resembled walnut of open pore finish.

EXAMPLE 12

A press plate with a protruding part of about 100μ height for the tracheal part was manufactured under the same conditions, except that a plate with an oak wood tracheal pattern of 60 mesh was used as a printing screen. A dark brown colorant was applied to the matted protruding part of the press plate alone. A melamine decorative laminate was manufactured using a titan sheet as a pattern sheet on which was printed an oak pattern. The decorative laminate obtained closely resembled an antique finish of actual oak wood since the tracheal part was deeply recessed, colored and matted.

The effects of the present invention will now be summarized. The decorative laminate of the present invention has the following effects and advantages:

(a) A decorative laminate having shiny protruding parts and matted recessed parts can be obtained. This type of decorative laminate could not be obtained with a metal press plate manufactured by a conventional etching method or the like. This decorative laminate is suitable for patterns of tile or enamel design.

(b) A decorative laminate having matted and colored recessed parts can be obtained. This decorative laminate is suitable for patterns of wood grain having tracheal parts or for tile patterns.

The manufacturing method of the decorative laminate of the present invention has the following effects or advantages:

(a) A release sheet need not be used in manufacturing a decorative laminate since the releasing properties of the enamel layer on the surface of the press plate from the resin are greatly superior.

(b) The press plate having an enamel layer can be prepared easily without requiring complicated processes such as etching and abrasion, resulting in economical manufacture.

(c) In manufacturing a melamine decorative laminate in general, pressures of 50–120 kg/cm$^2$ and temperature up to 140°–160° C. are required. Since the embossing plate used in the present invention is fired at a temperature of 500°–1,000° C., it can easily withstand the above-mentioned pressure and heat. The service life of this embossing press plate is therefore indefinitely long.

(d) When an enamel layer is formed on both surfaces of the press plate, warping of the enamel layer may be prevented in the firing process of the enamel layer may be prevented in the firing process of the enamel layer and the pressing process of the decorative laminate. Further, if a three-dimensional pattern is formed on the enamel layers on both surfaces of the press plate, molding of a decorative laminate may be performed on both surfaces so that the manufacturing efficiency is improved.

(e) Since the enamel layer has better thermal conductivity than a conventional resin press plate, the manufacturing efficiency is improved.

(f) Since the three-dimensional pattern of the enamel layer consists of smooth curves, dust tends not to collect thereon, and is easy to wipe off when it has collected.

What we claim is:

1. In a method for manufacturing a decorative laminate by hot-pressing a stack of resin-impregnated sheets with a press plate, which method comprises:
    (a) providing at least one press plate in the form of a metal substrate having at least one plain surface;
    (b) forming an enamel layer having a three-dimensional pattern or a gloss pattern or both on the plain surface of the metal substrate;
    (c) wherein the protruding parts of the three-dimensional pattern of the enamel layer include matted surfaces prepared by printing or transferring a frit ink with a matting agent added and firing same;
    (d) applying a colorant only to the matted surfaces of the protruding parts of the enamel layer by utilizing the difference in surface condition of the enamel layer between the matted portion and the smooth portion; and
    (e) hot-pressing the stack of resin-impregnated sheets with the at least one press plate to laminate the sheets together and emboss same, and to transfer the ink from the press plate to the surface of the decorative laminate so that the recessed parts of the decorative laminate are matted and colored.

2. The method of claim 1 wherein the enamel layer formed on the plain surface of the metal substrate includes a ground coat layer and a cover coat layer.

3. The method of claim 1 wherein the protruding parts of the three-dimensional pattern are of at least two different heights.

* * * * *

UNITED STATES PATENT AND TRADEMARK OFFICE
CERTIFICATE OF CORRECTION

PATENT NO. : 4,396,448
DATED : August 2, 1983
INVENTOR(S) : Kazuhiko Ohta et al

It is certified that error appears in the above—identified patent and that said Letters Patent is hereby corrected as shown below:

The correct Foreign Application Priority Data should read:

[30] --April 23, 1980   [JP] Japan.....53755/80
        May 9, 1980     [JP] Japan.....62130/80--

Signed and Sealed this

Fifteenth Day of November 1983

[SEAL]

Attest:

GERALD J. MOSSINGHOFF

Attesting Officer     Commissioner of Patents and Trademarks